US009124638B1

(12) United States Patent
Martini

(10) Patent No.: US 9,124,638 B1
(45) Date of Patent: Sep. 1, 2015

(54) APPLYING GROUP POLICIES

(71) Applicant: iboss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/472,302

(22) Filed: Aug. 28, 2014

(51) Int. Cl.
*H04L 29/06* (2006.01)
(52) U.S. Cl.
CPC .............. *H04L 63/20* (2013.01); *H04L 63/164* (2013.01)
(58) Field of Classification Search
CPC ..................................................... H04L 63/104
USPC ............................................................ 726/1
See application file for complete search history.

(56) References Cited

U.S. PATENT DOCUMENTS

| 7,197,638 | B1* | 3/2007 | Grawrock et al. ............ 713/165 |
| 7,752,487 | B1* | 7/2010 | Feeser et al. ................. 714/4.11 |
| 2004/0073814 | A1* | 4/2004 | Miyazaki et al. ............. 713/202 |
| 2005/0108539 | A1* | 5/2005 | Skog et al. .................... 713/176 |
| 2008/0134177 | A1* | 6/2008 | Fitzgerald et al. ................ 718/1 |
| 2010/0037311 | A1* | 2/2010 | He et al. ........................... 726/15 |
| 2014/0082365 | A1* | 3/2014 | Everhart et al. ............... 713/175 |

OTHER PUBLICATIONS

Berners-Lee, et al. "Hypertext Transfer Protocol HTTP/1.0", Network Working Group, Request for Comments: 1945, May 1996, downloaded from the internet at http://tools.org/pdf/rfc1945.pdf on Apr. 26, 2014, 60 pages.
Cisco Systems, Inc., "User Guide for ASA CX and Cisco Prime Security Manager 9.2", 2011-2013, downloaded from the internet at http://www.cisco.com/c/en/us/td/docs/security/asacx/9-2/user/guide/b_User_Guide_for_ASA_CX_and_PRSM_9_2.pdf on Apr. 26, 2014, 452 pages.
Fielding, et al. "Hypertext Transfer Protocol HTTP/1.1", Network Working Group, Request for Comments: 2616, Jun. 1999, downloaded from the internet at http://tools.ietf.org/pdf/rfc2616.pdf on Apr. 26, 2014, 114 pages.
Kirk, "Anomaly Detection Rules & The Success of Open-Source Rule Testing: Don't Do That, Part 2", Sep. 10, 2012, downloaded from the internet at http://vrt-blog.snort.org/2012/09/anomaly-detection-rules-success-of-open.html on Apr. 26, 2014, 2 pages.
Oracle Corporation, "Oracle Database Firewall", Jan. 2011, downloaded from the internet at http://www.oracle.com/technetwork/products/database-firewall/bwp-oracle-database-firewall-257258.pdf on Apr. 26, 2014, 10 pages.

* cited by examiner

Primary Examiner — Jason K Gee
(74) Attorney, Agent, or Firm — Fish & Richardson P.C.

(57) ABSTRACT

Information corresponding to a set of signatures is maintained, and for each signature in the set, an associated group policy of a network is maintained. A message from a device on the network is intercepted, and the message includes a header. At least a portion of the header matches a signature in the set of signatures. Responsive to determining that the portion of the header matches the signature, the matched signature's associated group policy of the network is applied to the device on the network.

28 Claims, 5 Drawing Sheets

APPLYING GROUP POLICIES

The present document relates to computer networking.

BACKGROUND

A computer network is a collection of computers and other hardware interconnected by communication channels that allow sharing of resources and information. Communication protocols define the rules and data formats for exchanging information in a computer network. Transport Layer Security (TLS) and Secure Socket Layer (SSL) are two examples of cryptographic communication protocols that provide communication security by allowing devices to exchange encrypted, as opposed to plaintext, messages. When a software agent operates in a network protocol, it often identifies itself, its application type, operating system, software vendor, or software revision, by submitting a characteristic identification string to its operating peer. This identification is sometimes called a user agent string. User agents and user agent strings are described in RFC 1945 and RFC 2616.

SUMMARY

In one aspect, a method is performed by data processing apparatus. The method includes maintaining information corresponding to a set of signatures, and for each signature in the set, an associated group policy of a network. The method further includes intercepting a message from a device on the network, the message includes a header. The method further includes determining that at least a portion of the header matches a signature in the set of signatures. The method further includes responsive to determining that the portion of the header matches the signature, applying the matched signature's associated group policy of the network to the device on the network.

Implementations can include any, all, or none of the following features. The message includes a Hypertext Transfer Protocol (HTTP) GET message and the header includes a user agent header. The portion of the header includes one or more tokens. At least some of the signatures in the set are product tokens. The method including applying, before intercepting the message, an initial group policy of the network to the device on the network; and wherein applying the signature's associated group policy of the network to the device on the network includes removing the initial group policy of the network from the device on the network. The intercepted message has an intended destination, and wherein applying the signature's associated group policy of the network to the device on the network causes the message to be blocked from reaching the intended destination. At least one of the signatures in the set represents deprecated software. At least one of the signatures in the set represents software with a possible security vulnerability. At least one of the signatures in the set represents a signature in a user agent string generated by malicious software. Each of the signatures in the set represents at least one selected from the group including deprecated software, software with a possible security vulnerability, and a signature in a user agent string generated by malicious software. The method including receiving, from an update server, data corresponding to a new signature to be added to the set of signatures; and updating the maintained information based on the received data.

In one aspect, a computer storage media encoded with computer program instructions that, when executed by one or more processors, cause a computer device to perform operations. The operations include maintaining information corresponding to a set of signatures, and for each signature in the set, an associated group policy of a network. The operations include further includes intercepting a message from a device on the network, the message includes a header. The operations further include determining that at least a portion of the header matches a signature in the set of signatures. The operations further include responsive to determining that the portion of the header matches the signature, applying the matched signature's associated group policy of the network to the device on the network.

Implementations can include any, all, or none of the following features. The portion of the header includes one or more tokens; and wherein at least some of the signatures in the set are product tokens. The storage media including applying, before intercepting the message, an initial group policy of the network to the device on the network; and wherein applying the signature's associated group policy of the network to the device on the network includes removing the initial group policy of the network from the device on the network. The intercepted message has an intended destination, and wherein applying the signature's associated group policy of the network to the device on the network causes the message to be blocked from reaching the intended destination. At least one of the signatures in the set represents deprecated software. At least one of the signatures in the set represents software with a possible security vulnerability. At least one of the signatures in the set represents a signature in a user agent string generated by malicious software. Each of the signatures in the set represents at least one selected from the group including deprecated software, software with a possible security vulnerability, and a signature in a user agent string generated by malicious software. The operations further include receiving, from an update server, data corresponding to a new signature to be added to the set of signatures; and updating the maintained information based on the received data.

In one aspect, a system includes one or more processors configured to execute computer program instructions. The system further includes computer storage media encoded with computer program instructions that, when executed by one or more processors, cause a computer device to perform operations includes maintaining information corresponding to a set of signatures, and for each signature in the set, an associated group policy of a network. The operations further include intercepting a message from a device on the network, the message includes a header. The operations further include determining that at least a portion of the header matches a signature in the set of signatures. The operations further include responsive to determining that the portion of the header matches the signature, applying the matched signature's associated group policy of the network to the device on the network.

Implementations can include any, all, or none of the following features. The message includes a Hypertext Transfer Protocol (HTTP) GET message and the header includes a user agent header. The portion of the header includes one or more tokens; and wherein at least some of the signatures in the set are product tokens. The operations further include including applying, before intercepting the message, an initial group policy of the network to the device on the network; and wherein applying the signature's associated group policy of the network to the device on the network includes removing the initial group policy of the network from the device on the network. The intercepted message has an intended destination, and wherein applying the signature's associated group policy of the network to the device on the network causes the message to be blocked from reaching the intended destination. At least one of the signatures in the set represents deprecated software. At least one of the signatures in the set represents software with a possible security vulnerability. At least one of the signatures in the set represents a signature in a user agent string generated by malicious software. Each of the signatures in the set represents at least one selected from the group including deprecated software, software with a possible security vulnerability, and a signature in a user agent string generated by malicious software. The operations further include receiving, from an update server, data corresponding to a new signature to be added to the set of signatures; and updating the maintained information based on the received data.

Implementations can include any, all, or none of the following features.

By monitoring the user agent strings of messages on a network, a network appliance can identify machines on the network that require corrective action. This corrective action can reduce dangers that deprecated or malicious software pose to the network. Automatic updates to signatures used to identify user agent strings can allow a vendor to update the security of multiple networks with respect to a newly discovered security flaw or newly released malware.

Other features, aspects and potential advantages will be apparent from the accompanying description and figures.

DESCRIPTION OF DRAWINGS

Like reference symbols in the various drawings indicate like elements

DETAILED DESCRIPTION

A network appliance, such as a network gateway, can monitor user agent strings found in network messages. When one or more of the tokens that make up the user agent string match a stored signature, the network appliance can apply a corrective action. Example corrective actions include, but are not limited to, applying a new group policy to the device that issued the user agent string.

Applications running on client computers can generate network messages that include a user agent string. A user agent string can include a collection of tokens that specify details of the client and/or the application. For example, a web browser may create messages requesting resources, and those requests may have a header containing a user agent string. The user agent string may include tokens identifying, for example, the operating system of the client computer, the browser and browser version, and a list of plug-ins available to the browser.

A network appliance such, as a network gateway, may monitor the messages created by the client computers on the network and may compare user agent strings in the messages with a stored collection of signatures. When the network appliance identifies a match between a user agent string and a signature, the network appliance can apply a corrective action designated by the signature. For example, the network appliance can apply a new group policy to the client machine that generated the message with the user agent string.

Figure 1:
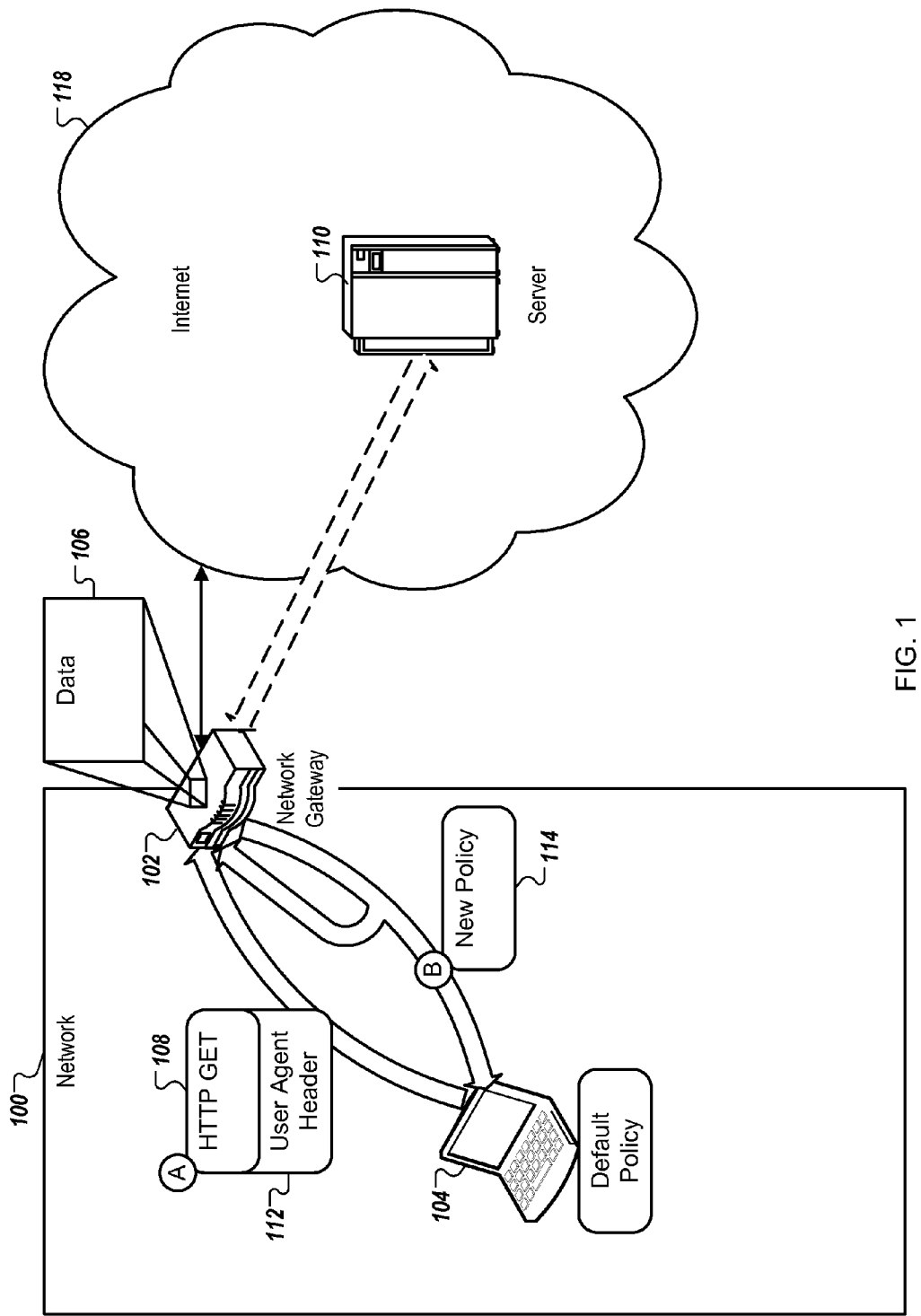
FIG. 1 is a block diagram of an example network that monitors user agent strings.

FIG. 1 is a block diagram of an example network 100 that monitors user agent strings. The network 100 can include a network gateway 102 and a client device 104 which represents any appropriate computing devices capable of browsing resources inside or outside of the network 100. While not shown for clarity's sake, the network 100 can include other elements including, but not limited to, wireless and/or wired access points, file and/or application servers, routers, and network cables, as well as additional client devices and network gateways.

The network 100 can be configured to route some or all of the traffic into and out of the network 100 through the gateway 102. For example, the gateway 102 may inspect network traffic to enforce security policies, prevent malicious software from entering the network, etc. Additionally, the gateway 102 may provide directory services for the clients of the network 100 (e.g., ApacheDS, Active Directory), may apply group policies (e.g., security policies) to devices on the network 100, and may assign the client device 104 to a subnet. These group policies can include profiles that can be assigned to devices on the network 100 and that define and enforce the operating environment of the devices. These environment definitions can include, but are not limited to, permitted or denied operating systems, applications, user permissions, and/or network activity. In some configurations, some schemes for using group policies refer to group policies as "group policies." In some other configurations, some schemes for using group policies refer to a similar concept by other terms such as Group Policy Objects (GPOs), or policy groups.

The network gateway 102 may maintain data 106 that identifies a set of signatures and, for each signature in the set, an associated group policy of the network. In some cases, a single signature may be associated with zero, one, or multiple group policies, and a single group policy may be associated with zero, one or multiple signatures. These group policies may also be used by the network 100 in other contexts. For example, a network 100 may have a default group policy for mobile device and another default group policy for desktop computers. These default group policies may be applied to a mobile device or a desktop computer when it joins the network 100. One, either, or neither of these group policies may be associated with a signature in the data 106.

When the network gateway 102 receives a message, for example a request 108 from the client device 104 for a resource on the server 110, the network gateway 102 can compare the user agent string in the request 108 with the signatures stored in the data 106. If the gateway 102 does not find a match between the user agent string and any stored signature, the network gateway 102 can perform no action or perform some action designated to be taken when no match is found. For example, the network gateway 102 could route the request 108 toward the destination, the server 110.

If the gateway 102 does find a match between the user agent and one or more stored signatures, the gateway 102 can take a corrective action indicated by the associated signature. In one example, the user agent string 112 may match a signature that identifies devices running a deprecated web browser. The data 106 may associate this signature with a group policy that redirects all web browsing by the web browser to the web browser's upgrade website. In this example, the network gateway 106 can apply this group policy to the client device 104 by, for example, sending an update 114 to the client device 104, processing the update 114 internally, and/or sending an update 114 to another element of the network 100.

In some cases, a single user agent string 112 may match more than one signature in the data 108. In those cases, a number of different conflict resolution mechanisms may be used to determine which group policy or group policies should be applied. For example, the signatures may be listed in order of priority, and the group policy associated with the signature with the highest prior may be applied 114. In another example, the narrowest of all policies identified may be applied 114. In yet another example, a plurality of group policies may be applied 114.

This example shows the request 108 as a Hypertext Transfer Protocol (HTTP) GET request and the user agent string 112 as a User Agent Header, other types of messages may be used. For example File Transfer Protocol (FTP) messages from file transfer applications may be monitored by the network gateway 102.

This example shows a network gateway monitoring user agent strings and applying corrective actions, other types of network appliances may be used. For example, a router, a server, a dedicated user agent filter, a firewall, a client device, or a mobile device may be used in other configurations.

Figure 2:
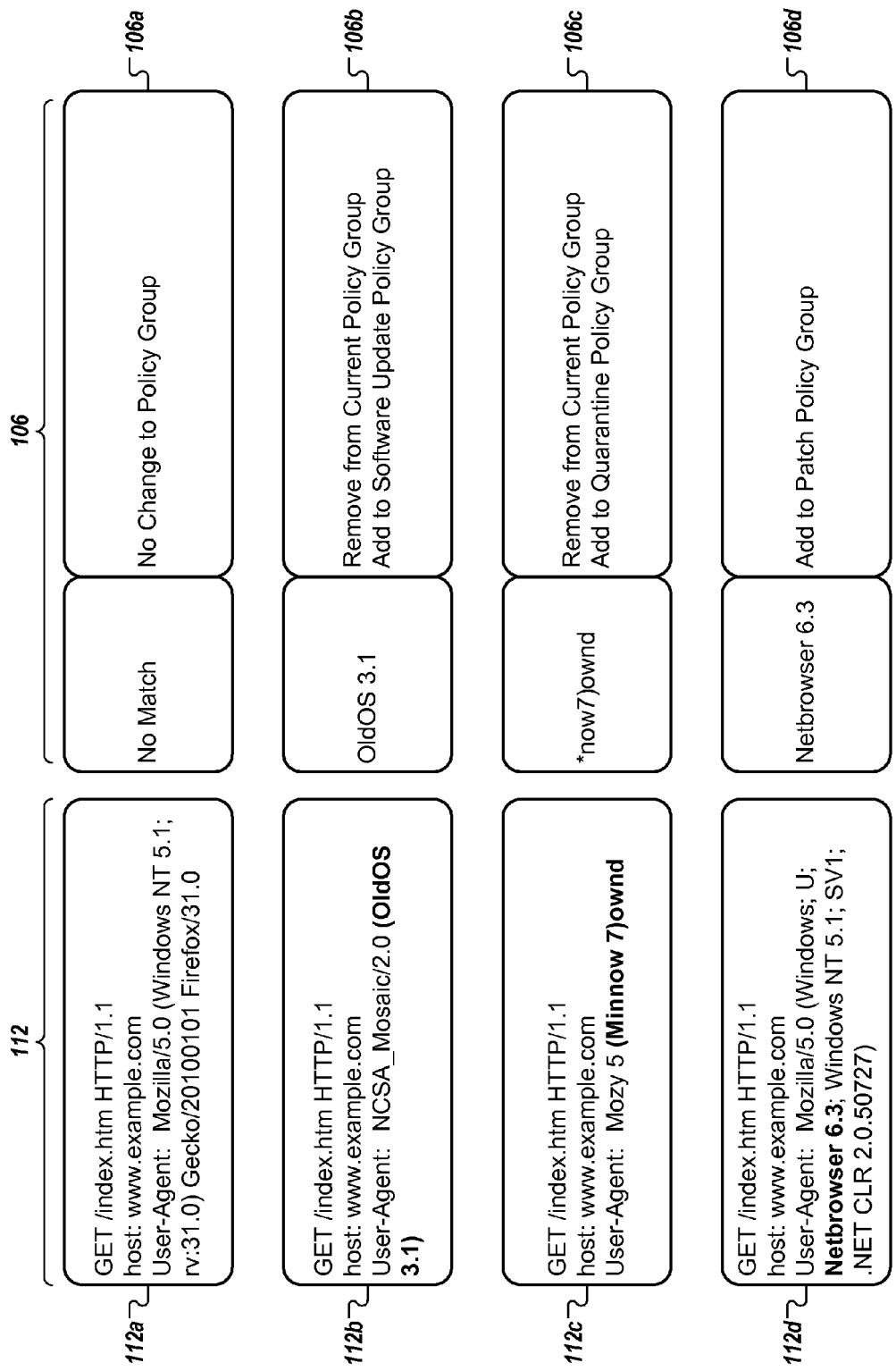
FIG. 2 shows example user agent strings and their corresponding corrective actions.

FIG. 2 shows example user agent strings 112 and their corresponding corrective actions. For each user agent string 112a-112d, corresponding data 106a-106d may be used by a network to define a corresponding corrective action. In many cases, the corrective action can be logically related to something identified in the user agent string 112. For example, a user agent string 112 that indicates a malware infection may have a corresponding corrective action designed to remove the malware, segregate the computer from the network, or otherwise account for the malware. The user agent strings 112 and the corresponding data 106 may be used, for example, by the elements described with respect to FIG. 1.

User agent string 112a may be included, for example, in a HTTP GET request from a client 104 running an up-to-date web browser on an up-to-date operating system. The data 106 may, in this example, contain no signatures that explicitly match any substrings (e.g., token, tokens, or partial tokens) of the user agent string 112a. As such, the user agent string 112a may be handled without the application of a corrective action. In other cases, the data 106 may contain an entry like 106a that specifies a corrective action to take for user agent strings that do not match any other entries in the data 106. In this example, the corrective action is "No Change to Policy Group."

User agent string 112b may be included, for example, in a HTTP GET request from a client 104 running a deprecated operating system. In this example, the deprecated operating system is represented by the token "OldOS 3.1". The data 106 may contain an entry 106b with a signature that includes the token "OldOS 3.1" that specifies a corrective action to "Remove from Current Policy Group and Add to Software Update Policy Group." The "Update Software Policy Group" may, for example, redirect all web browsing to the update web page of the operating system. Later, once the user has updated the computer's operating system, the client can produce user agent strings for an up-to-date version of the operating system.

User agent string 112c may be included, for example, in a HTTP GET request from a client 104 that has been infected with malware. Generally speaking, malware includes software and programs that are used to disrupt computer operation, gather sensitive information, and/or gain access to private computer systems. Some instances of malware can generate network requests that include user agent string that include identifiable substrings. In the example of user agent string 112c, a substring "(Minnow 7)ownd" is included. This substring can match a signature "*now7)ownd", where the "*" character is a wildcard. The data 106 may contain an entry 106c with a signature "*now7)ownd" and that specifies a corrective action "Remove from Current Policy Group and Add to Quarantine Policy Group". The "Quarantine Policy Group" may, for example, quarantine the associated computer such that it may not generate any network traffic, thus protecting the rest of the network from the infecting malware. Later, once the malware has been removed from the computer, the computer may be removed from the "Quarantine Policy Group."

User Agent string 112d may be included, for example, in a HTTP GET request from a client 104 that is running a relatively recent web browser (e.g., one that may not be deprecated), but where the web browser contains a security vulnerability. In the example of user agent string 112d, a substring "Netbrowser 6.3" is included. The data 106 may contain a signature "Netbrowser 6.3" that specifies the corrective action "Add to Patch Policy Group," which is a policy group that causes the associated computer to patch any running software that is not up to the most recent version. In this example, the computer that generated the user agent string 112d is not removed from its current policy group. In other instances, the corrective action may include instructions to remove the computer from its current policy group. For example, if the vulnerability associated with the version 6.3 of Netbrowser is considered minor, it may not be associated with a remove from current policy group and if the vulnerability is considered major, it may be associated with a remove from the current policy group.

In some cases, signatures may include special characters such as variables or wildcard signatures. In some cases, signatures may be in the form of computer readable instructions such as Regular Expressions (regex) strings to be matched to user agent string substrings according to known or new searching processes. In some cases, signatures may be or may include one or more product tokens, as described in RFC 2616.

Figure 3:
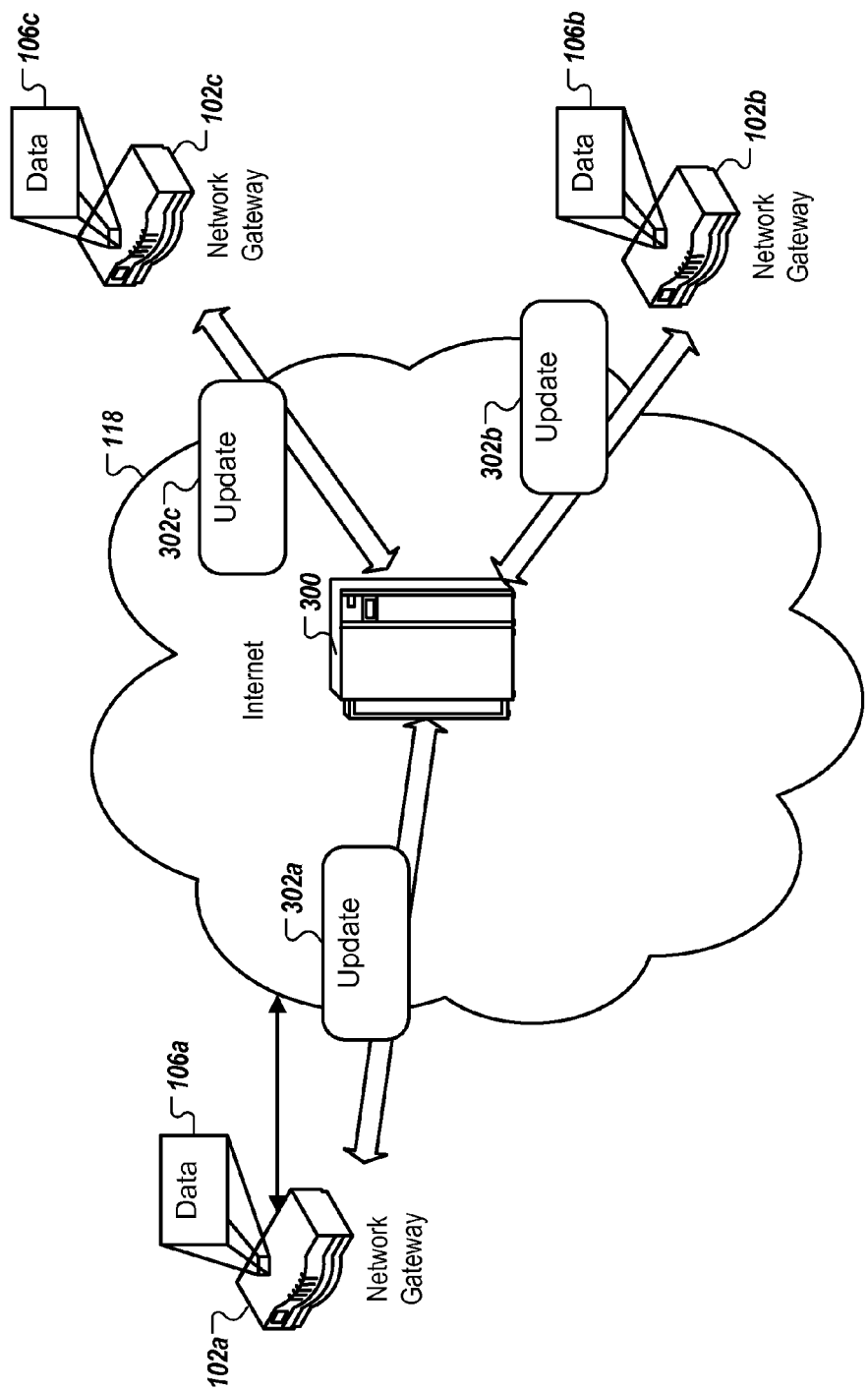
FIG. 3 shows an example of a server that can send signature updates to multiple network appliances.

FIG. 3 shows an example of a server 300 that can send signature updates to multiple network appliances. In this example, the server 300 is operated by a business or organization that is responsible for tracking security and technology trends, and for providing updates to network appliances that take into account newly available information.

In this example, a group of network appliances 102 receive updates 302 from the server 300. The network appliances 102 may be homogeneous, that is generally the same hardware running the same software, or heterogeneous, that is generally different hardware and/or software. The network appliances 102 may receive the updates 302 according to any appropriate communication scheme, including but not limited a publish-subscribe list, a Real Simple Syndication (RSS) feed, and/or email distribution. Each update 302 may be the same or different, depending on the configuration. For example, update 302a may be published on a daily basis while update 302b may be sent only in response to a request by the network appliance 102b. Further, the content of each update 302 may be the same or different. For example, update 302c may contain updates related only to malware and security vulnerabilities, while update 302b may contain all possible updates.

The updates 302 may contain data that is used by network appliances 102 to update data 106. For example, the updates 302 may contain one or more new signatures. The network appliances 102 may, upon receipt of updates 302, update the data 106 by including the new signature or signatures. Additionally, the updates 302 may include a description of the purpose of the signature (e.g., related to a new security vulnerability in a popular email client), a proposed corrective action, or other data. This other data, along with a network administrator's knowledge of their networks needs and other information collected from other sources may be used to set one or more corrective actions in association with the new signature in the data 106.

For example, an update 302 may include a new signature, a human-readable note that the signature relates to a new exploit discovered that targets a particular version of an operating system and that no patch is yet available to prevent the exploit, and a proposed corrective action to quarantine computers with the vulnerable operating system. The administrator of the network appliance 102a may, in this example, allow the data 106a to be updated with the new signature and the proposed corrective action. Then, any user agent string that the network appliance identifies as matching the new signature will trigger the proposed corrective action. Alternatively, the administrator of the network appliance 102b may decline to update the data 106b. This declination may be automatic or user driven. For example, the network that hosts the network appliance 102b may be configured to never host a computer with the vulnerable operating system. In yet another example, the proposed signature may be used to update the data 106, but a configuration different than proposed in the update 302. For example, the administrator of the network appliance 102c may determine that quarantining computers running the vulnerable operating system is too disruptive, and instead creates a new corrective action to apply a group policy specifying heightened traffic analysis for any computer running the vulnerable operating system. In this example, the data 106c is updated with new signature but not with the proposed corrective action.

The updates 302 may be generated to cover a range of issues that may affect computer networks. In some cases, an update 302 may contain a signature for a piece of software that becomes deprecated. Deprecated software can include software that is old, out of support lifecycle, abandoned by its developers, and/or replaced with a different software package. In many, but not all, cases, deprecated software generally still functions for its intended purposes. However, some security and best-practices require that unsupported software be identified and/or removed from a network. This may, for example, reduce the number of future vulnerabilities in a network.

In some cases, an update 302 may contain a signature for a piece of software that contains a known vulnerability that is actively being exploited or could be exploited. For example, a piece of software may have a flaw that permits sandboxed code to escape the sandbox, a flaw that exposes protected memory contents, or a flaw that permits remote code execution. Such flaws can form the basis of exploits that may be used to infiltrate a network, exfiltrate data, or cause other harm. Often, these flaws are patched by the software vendors or developers, and the most current versions of the software do not contain the exploitable flaw. In order to educate users about the available update and/or force the client on a network to patch their software, an update 302 with a signature for the vulnerable versions of the software may be distributed.

In some cases, an update 302 may contain a signature for a piece of malware that has been discovered to generate a unique or predictable user agent string. For example, malware may generate network messages with inconsistent user agent strings (e.g., specifying an operating system and software that are not compatible), user agent strings with particular errors, or user agent strings that are valid but not actually representative of their host computing system.

Figure 4:
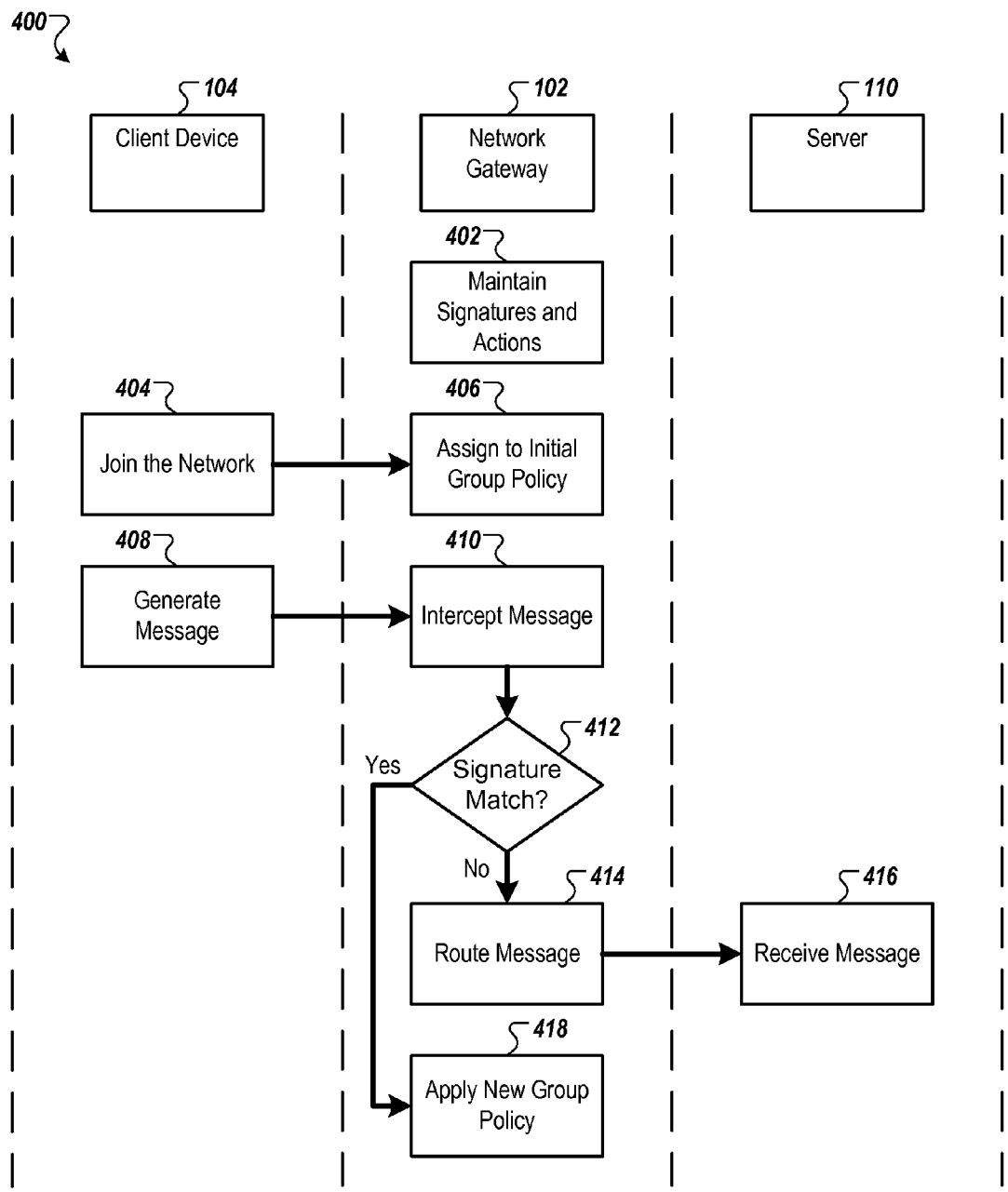
FIG. 4 is a swim-lane diagram of an example process for monitoring user agent strings and applying corrective actions.

FIG. 4 is a swim-lane diagram of an example process 400 for monitoring user agent strings and applying corrective actions. The process 400 is described with reference to component shown in FIG. 1. However, other components can be used to perform the process 400 or another similar process. In this example, the process 400 uses the HTTP communication protocol. However, other communication protocols may be used in addition or alternative.

The network gateway 102 maintains (402) information corresponding to a set of signatures, and for each signature in the set, an associated group policy of the network. For example, the network gateway 104 can record data 106 or other information that can be used to identify elements of a user agent string and to apply a corrective action in response to identifying those elements. In some cases, the signatures can include product tokens. Product tokens may be configured to list, for example, a product name, a version of a product, or both. In some cases, the information may be stored in a location that is physically remote and communicable coupled to the network gateway 102.

The client device 104 joins (404) the network. The network gateway 102 assigns (406) the client device 104 to an initial group policy of the network. For example, the client device 104 may be a desktop computer that a user boots up and connects to the network. As part of this process, the network gateway 102 may, for example, assign the client device 104 an IP address and assigns the client device 104 to an initial policy group. The initial policy group may be selected based on any appropriate data including, but not limited to, the hardware and operating system of the client device and/or the user that is logged into the client device 104 (e.g., if the user is a member of a user group of the network).

The client device 104 generates (408) a message that includes a header. For example, after the client device 104 has successfully joined the network, the user may open a web browser and enter the address of a web site associated with the server 110. The web browser can generate an HTTP GET message that includes a header that includes a user agent string. This user agent string can include tokens that identify, for example, the operating system, browser, and plug-ins available on the client device 104.

The network gateway 102 intercepts (410) the message that includes the header. For example, after generating the HTTP GET message, the client device 104 can pass the message to the network in order for it to be routed to the server 110. As part of this routing, the message may be passed to the network gateway 102. Once received, the network gateway 102 can examine the user agent string before or instead of routing the message toward the server 110.

If the network gateway 102 determines (412) that that no portion of the header matches a signature in the set of signatures, the network gateway 102 may take a default action. For example, the network gateway 102 may be configured such that the default action is to route (414) the message so that the server 110 receives (416) the message. In response, the server may respond to the received message as appropriate, for example by serving the web page to the client device 104 (not shown).

If the network gateway 102 determines (412) that at least a portion of the header matches a signature in the set of signatures, the network gateway 102 may take (418) a corrective action. For example, the corrective action may include applying a new group policy to the client device 104. Additionally and/or alternatively, the corrective action may include removing the client device 104 from the initial policy group to which it was assigned. Additionally and/or alternatively, the corrective action may include blocking the message so that it is not routed to the server 110.

In some implementations, the portion of the header that matches a signature is a one or more tokens in a user agent string. For examples with headers generated by software that doesn't correctly conform to standard user agent string conventions, the portion of the header that matches a signature may be a portion of the header (e.g., a substring of the header if it is a string) or the entire header.

Although a particular number, type, and order of actions is shown in the process 400, different numbers, types, and/or orders of actions may be used. For example, instead of routing the message to the server 110, a different default action may be taken if there is not found (412) to be a match between the header and signatures. As another example, the corrective action may include routing the message to the server 110. As another example, the network gateway 102 may not remove the client device 102 from the initial group policy. As another example, the new group policy may specify that the traffic to and from the client device 104 be logged in more detail than is standard on the network. As another example, the actions described as being taken by the network gateway 102 may be taken by another hardware device (e.g., a firewall, a server) or a collection of hardware devices (e.g., a network gateway and a man-in-the-middle gateway).

Figure 5:
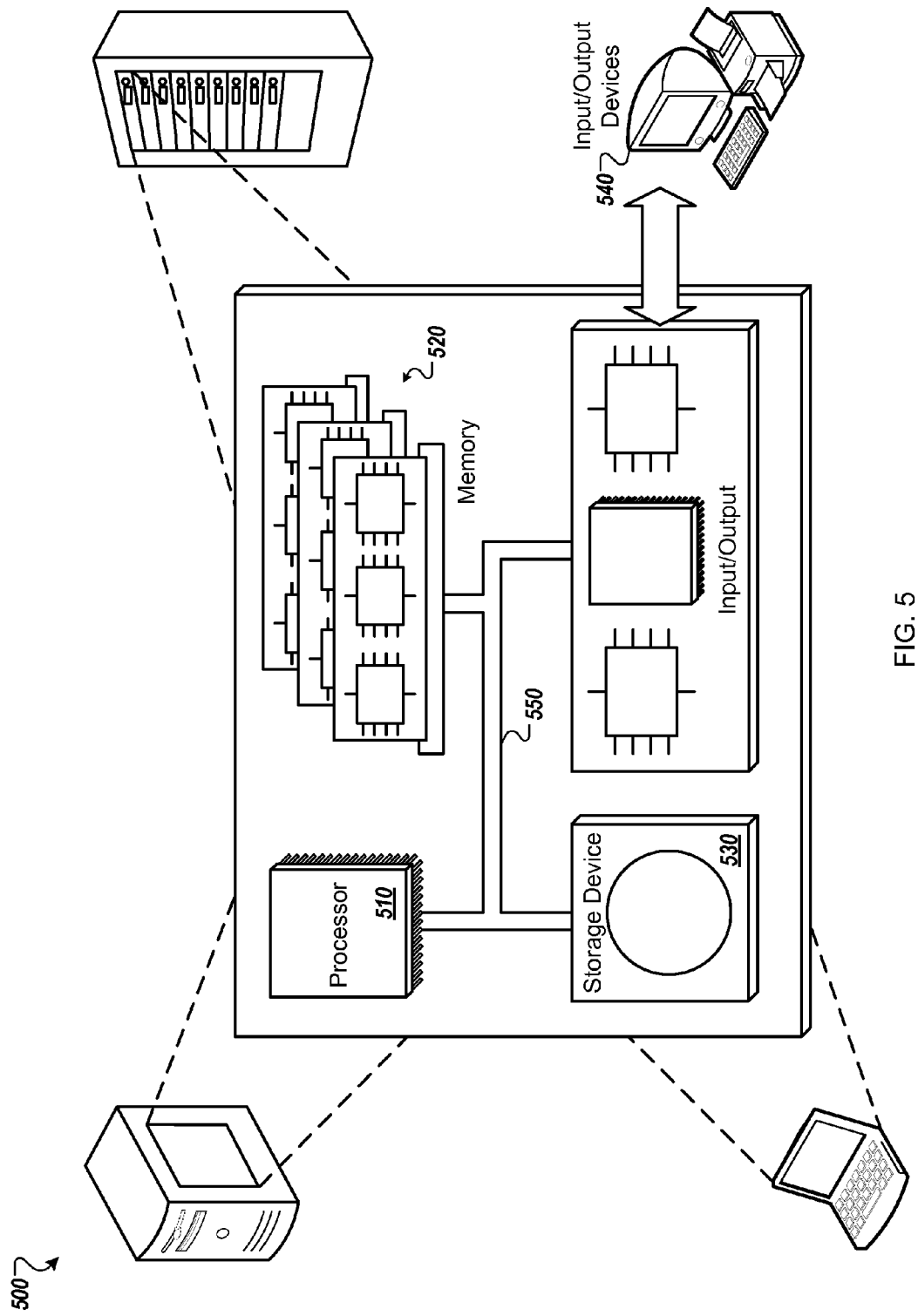
FIG. 5 is a schematic diagram that shows an example of a computing system.

FIG. 5 is a schematic diagram that shows an example of a computing system 500. The computing system 500 can be used for some or all of the operations described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550. The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures and privacy settings are available options to be used to ensure user security and privacy are respected.

What is claimed is:

1. A method performed by data processing apparatus, the method comprising: maintaining information corresponding to a set of signatures, and for each signature in the set, an associated group policy of a network, wherein each signature contains substrings designed to be matched against substrings of user agent strings; receiving, from a first device, a particular signature; adding information corresponding to the particular signature to the information corresponding to the set of signatures; intercepting, subsequent to adding the information corresponding to the particular signature to the set of signatures, a message from a second device on the network, the message comprising a Hypertext Transfer Protocol (HTTP) GET message and a header; determining that at least a portion of the header matches the particular signature in the set of signatures by matching a substring of the particular signature to a substring of a user agent string of the header; and responsive to determining that the portion of the header matches the particular signature, applying the matched signature's associated group policy of the network to the second device on the network.

2. The method of claim 1, wherein the portion of the header comprises one or more tokens.

3. The method of claim 1, wherein at least some of the signatures in the set are product tokens.

4. The method of claim 1, the method further comprising:
applying, before intercepting the message, an initial group policy of the network to the second device on the network; and
wherein applying the signature's associated group policy of the network to the second device on the network comprises removing the initial group policy of the network from the second device on the network.

5. The method of claim 1, wherein the intercepted message has an intended destination, and wherein applying the signature's associated group policy of the network to the second device on the network causes the message to be blocked from reaching the intended destination.

6. The method of claim 1, wherein at least one of the signatures in the set represents deprecated software.

7. The method of claim 1, wherein at least one of the signatures in the set represents software with a possible security vulnerability.

8. The method of claim 1, wherein at least one of the signatures in the set represents a signature in a user agent string generated by malicious software.

9. The method of claim 1, wherein each of the signatures in the set represents at least one selected from the group comprising deprecated software, software with a possible security vulnerability, and a signature in a user agent string generated by malicious software.

10. The method of claim 1, wherein the group policy defines one or more security policies to be applied to an associated device's environment.

11. The method of claim 1, wherein the group policy causes web browsing traffic from the second device to be redirected to an upgrade website.

12. The method of claim 1, wherein the group policy comprises at least one Group Policy Object (GPO).

13. A non-transitory computer storage media encoded with computer program instructions that, when executed by one or more processors, cause a computer device to perform operations comprising: maintaining information corresponding to a set of signatures, and for each signature in the set, an associated group policy of a network, wherein each signature contains substrings designed to be matched against substrings of user agent strings; receiving, from a first device, a particular signature; adding information corresponding to the particular signature to the information corresponding to the set of signatures; intercepting, subsequent to adding the information corresponding to the particular signature to the set of signatures, a message from a second device on the network, the message comprising a Hypertext Transfer Protocol (HTTP) GET message and a header; determining that at least a portion of the header matches the particular signature in the set of signatures by matching a substring of the particular signature to a substring of a user agent string of the header; and responsive to determining that the portion of the header matches the particular signature, applying the matched signature's associated group policy of the network to the second device on the network.

14. The storage media of claim 13, wherein the portion of the header comprises one or more tokens; and
wherein at least some of the signatures in the set are product tokens.

15. The storage media of claim 13, the operations further comprising:
applying, before intercepting the message, an initial group policy of the network to the second device on the network; and
wherein applying the signature's associated group policy of the network to the second device on the network comprises removing the initial group policy of the network from the second device on the network.

16. The storage media of claim 13, wherein the intercepted message has an intended destination, and wherein applying the signature's associated group policy of the network to the second device on the network causes the message to be blocked from reaching the intended destination.

17. The storage media of claim 13, wherein at least one of the signatures in the set represents deprecated software.

18. The storage media of claim 13, wherein at least one of the signatures in the set represents software with a possible security vulnerability.

19. The storage media of claim 13, wherein at least one of the signatures in the set represents a signature in a user agent string generated by malicious software.

20. The storage media of claim 13, wherein each of the signatures in the set represents at least one selected from the group comprising deprecated software, software with a possible security vulnerability, and a signature in a user agent string generated by malicious software.

21. A system comprising: one or more processors configured to execute computer program instructions; and computer storage media encoded with computer program instructions that, when executed by one or more processors, cause a computer device to perform operations comprising: maintaining information corresponding to a set of signatures, and for each signature in the set, an associated group policy of a network, wherein each signature contains substrings designed to be matched against substrings of user agent strings; receiving, from a first device, a particular signature; adding information corresponding to the particular signature to the information corresponding to the set of signatures; intercepting, subsequent to adding the information corresponding to the particular signature to the set of signatures, a message from a second device on the network, the message comprising a Hypertext Transfer Protocol (HTTP) GET message and a header; determining that at least a portion of the header matches the particular signature in the set of signatures by matching a substring of the particular signature to a substring of a user agent string of the header; and responsive to determining that the portion of the header matches the particular signature, applying the matched signature's associated group policy of the network to the second device on the network.

22. The system of claim 21, wherein the portion of the header comprises one or more tokens; and
   wherein at least some of the signatures in the set are product tokens.

23. The system of claim 21, the operations further comprising:
   applying, before intercepting the message, an initial group policy of the network to the second device on the network; and
   wherein applying the signature's associated group policy of the network to the second device on the network comprises removing the initial group policy of the network from the second device on the network.

24. The system of claim 21, wherein the intercepted message has an intended destination, and wherein applying the signature's associated group policy of the network to the second device on the network causes the message to be blocked from reaching the intended destination.

25. The system of claim 21, wherein at least one of the signatures in the set represents deprecated software.

26. The system of claim 21, wherein at least one of the signatures in the set represents software with a possible security vulnerability.

27. The system of claim 21, wherein at least one of the signatures in the set represents a signature in a user agent string generated by malicious software.

28. The system of claim 21, wherein each of the signatures in the set represents at least one selected from the group comprising deprecated software, software with a possible security vulnerability, and a signature in a user agent string generated by malicious software.

* * * * *